US012112277B2

(12) United States Patent
Nagarajan et al.

(10) Patent No.: US 12,112,277 B2
(45) Date of Patent: Oct. 8, 2024

(54) COMPUTER-BASED SYSTEMS CONFIGURED TO UTILIZE PREDICTIVE MACHINE LEARNING TECHNIQUES TO DEFINE SOFTWARE OBJECTS AND METHODS OF USE THEREOF

(71) Applicant: American Express Travel Related Services Company, Inc., New York, NY (US)

(72) Inventors: Venkatesh Nagarajan, Scottsdale, AZ (US); Xiangzhen Kong, Hoboken, NJ (US); Neha Arya, New York, NY (US); Mansi Sharma, Edison, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/110,561

(22) Filed: Feb. 16, 2023

(65) Prior Publication Data
US 2023/0196143 A1   Jun. 22, 2023

Related U.S. Application Data

(63) Continuation of application No. 16/731,991, filed on Dec. 31, 2019, now Pat. No. 11,593,677.

(51) Int. Cl.
*G06F 7/00*     (2006.01)
*G06F 16/9535*  (2019.01)
(Continued)

(52) U.S. Cl.
CPC .......... *G06N 5/04* (2013.01); *G06F 16/9535* (2019.01); *G06N 20/00* (2019.01)

(58) Field of Classification Search
CPC .............. G06F 16/9535; G06F 16/221; G06F 16/2228; G06F 16/182; G06F 16/1831;
(Continued)

(56) References Cited

U.S. PATENT DOCUMENTS 9,355,155 B1     5/2016   Cassel et al.
11,263,275 B1 *  3/2022   Merritt ............... G06F 16/9027
(Continued)

OTHER PUBLICATIONS

Co-pending U.S. Appl. No. 16/731,991, filed Dec. 31, 2019 entitled "Computer-Based Systems Configured to Utilize Predictive Machine Learning Techniques to Define Software Objects and Methods of Use Thereof," inventors Nagarajan et al. (Not Published).

*Primary Examiner* — Mohammad A Sana
(74) *Attorney, Agent, or Firm* — Sterne Kessler, Goldstein and Fox P.L.L.C.

(57) ABSTRACT

At least some embodiments are directed to a prediction system of software objects. The prediction system predicts a first aspect of a user profile utilizing a categorization machine learning model and a user activity profile, the user profile and the user activity profile are associated with a user. The user activity profile comprises a plurality of values associated with demographics and historical activity data of the user. The prediction system predicts a software object associated with the user profile utilizing an optimization machine learning model, the first aspect of the user profile, and a second aspect of the user profile. The software object is optimized with respect to at least one competitive interest between the user associated with the user profile and an entity associated with the software object. The prediction system outputs the software object to a client computing device of the user.

18 Claims, 7 Drawing Sheets

(51) Int. Cl.
*G06N 5/04* (2023.01)
*G06N 20/00* (2019.01)

(58) Field of Classification Search
CPC ...... G06F 16/273; G06F 16/906; G06F 16/93;
G06F 16/24578; G06N 5/04; G06N 5/01;
G06N 5/022; G06N 3/006; G06N 20/00;
G06N 20/20; G06N 7/01
See application file for complete search history.

(56) References Cited

U.S. PATENT DOCUMENTS

| | | | |
|---|---|---|---|
| 11,316,941 B1* | 4/2022 | Jain | H04L 41/0816 |
| 2019/0244129 A1 | 8/2019 | Tabuchi et al. | |
| 2019/0361923 A1 | 11/2019 | Joseph et al. | |
| 2020/0019893 A1 | 1/2020 | Lu | |
| 2020/0134228 A1* | 4/2020 | Kottekulam Vasu | G06Q 30/02 |
| 2020/0322445 A1* | 10/2020 | Dhanabalan | H04L 67/04 |
| 2021/0125290 A1* | 4/2021 | Mota Manhaes | G06F 18/251 |

* cited by examiner

COMPUTER-BASED SYSTEMS CONFIGURED TO UTILIZE PREDICTIVE MACHINE LEARNING TECHNIQUES TO DEFINE SOFTWARE OBJECTS AND METHODS OF USE THEREOF

CROSS-REFERENCE TO RELATED APPLICATIONS

This application is a continuation of, and claims priority to and benefit of U.S. patent application Ser. No. 16/731,991 filed on Dec. 31, 2019, which is incorporated herein by reference in its entirety.

BACKGROUND OF TECHNOLOGY

Some software objects can have multiple features. Typically, generating software objects can be a technologically daunting task when there are multiple competitive objectives between one or more entities with respect to such software objects.

SUMMARY OF DESCRIBED SUBJECT MATTER

In some embodiments, the present disclosure provides technically improved computer-based system/method/apparatus that includes at least the following components/steps of a computer-based prediction system. At least some embodiments are directed to an example of prediction system. The prediction system predicts a first aspect of a user profile utilizing a categorization machine learning model and a user activity profile, the user profile and the user activity profile are associated with a user. The user activity profile comprises a plurality of values associated with demographics and historical data of the user. The prediction system can predict a software object associated with the user profile utilizing an optimization machine learning model, the first aspect of the user profile, and a second aspect of the user profile. The software object is optimized with respect to at least one competitive interest between the user associated with the user profile and an entity associated with the software object. The prediction system outputs the software object to a client computing device of the user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Figure 1:
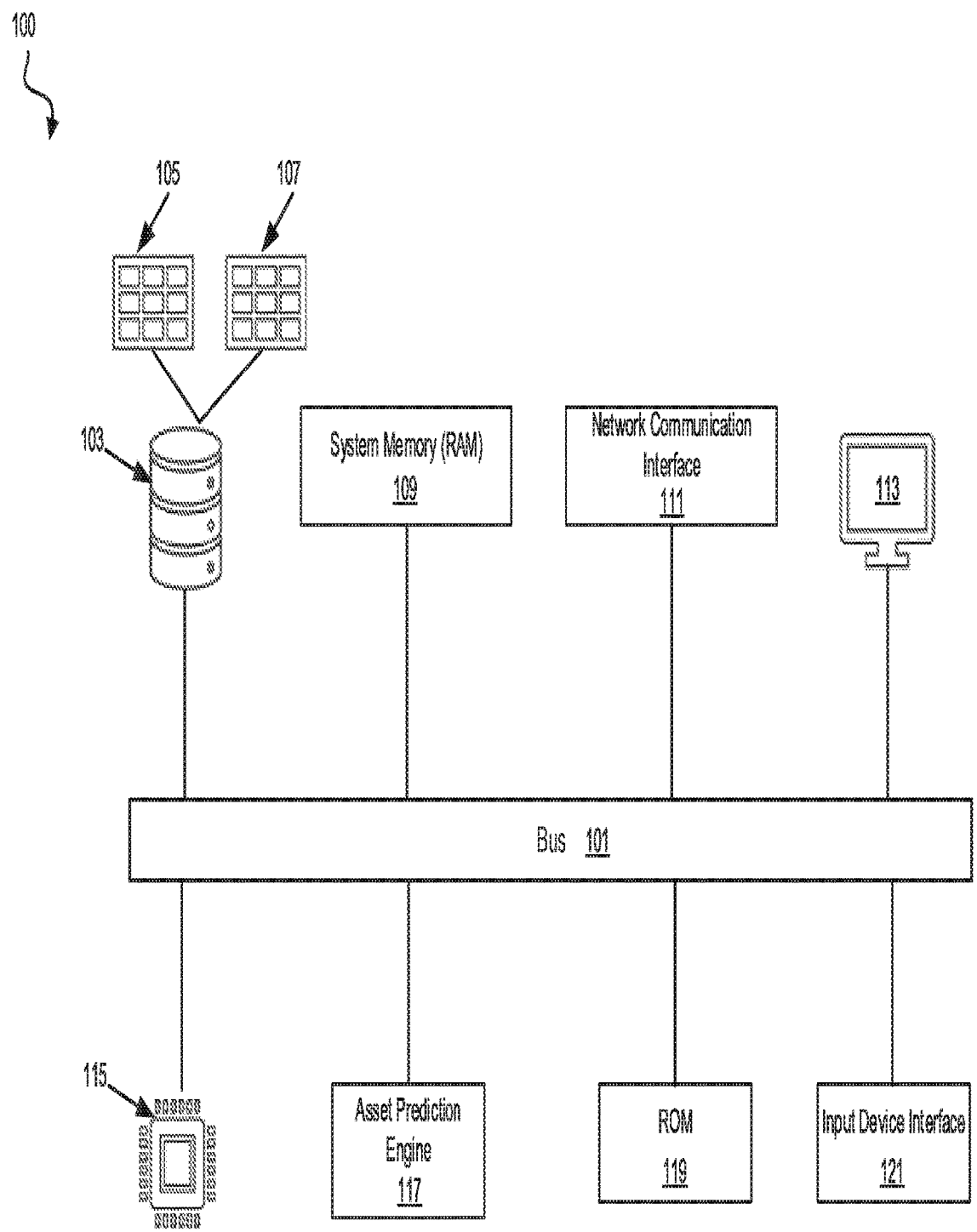
FIGS. 1-7 show one or more schematic flow diagrams, certain computer-based architectures, and/or implementations which are illustrative of some examples of features of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

FIGS. 1 through 7 illustrate systems and methods for production of computer based software objects. The following embodiments provide technical solutions and/or technical improvements that overcome technical problems, drawbacks and/or deficiencies in the technical field of identification cards. As explained in more detail, below, technical solutions and/or technical improvements herein include features of improved optimization of design and production of computer-based software objects. Moreover, various practical applications of the disclosed technology are also described, which provide further practical benefits to users and operators that are also new and useful improvements in the art.

In some embodiments, as detailed herein, a particular software object can be associated with an asset, a product, a resource, and/or a digital object offered or provided to a user or a user by a non-person entity (e.g., an organization or institution).

As used herein, the term "classification machine learning model" can refer to at least one machine learning model that receives a set of data points associated with a user or non-person entity and assigns at least one type of aspect or class type for such a user or non-person entity.

As used herein, the term "optimization machine learning model" can refer to at least one machine learning model that receives inputs associated with at least two parties and optimizes competitive interests and/or goals between the two parties.

Various embodiments are directed to the technological problem associated with accurate prediction of multi-feature or multi-characteristic software objects for users. In some instances, various assets represented, for example, as software objects can have multiple characteristics or features. Likewise, users can have multiple personal and/or historical characteristics that may or may not be compatible with a software object. Various embodiments, provide at least one technical solution by implementing at least one machine learning model to predict at least one suitable software object for a user based on user characteristics such as, user activities, user profile, and/or user personal identifiable data so that at least one feature of the suitable software object can be customized and optimized to the user. For example, implementing the at least one machine learning model allows to predict a plurality of software objects customized for the user, to perform a risk-assessment analysis using a plurality of values associated with historical data of the user to generate a set of confidence values, and to produce the at least one software object that optimized to the user.

FIG. 1 illustrates an example of an embodiment of a real-time optimization system, in accordance with one or more embodiments of the present disclosure. In some embodiments, the asset prediction system 100 can include a communication bus 101, a database 103, a processor 115, a system memory 109, an output device interface such as display 113, a network communication interface 111, an asset prediction engine 117, a read-only memory 119, and an input device interface 121.

In some embodiments, the communication bus 101 collectively circuitry that communicatively connect the numerous internal devices of the asset prediction system 100, such as database 103, system memory 109, network communication interface 111, display 113, asset prediction engine 117, ROM 119, and input device interface 121. The communication bus 101 can be, for example, a physical interface for interconnecting the various components or internal devices.

In some embodiments, database 103 can store datasets or records 105 and 107 including data values or features associated with user profiles and activity profiles associated with one or more users and non-person entities. The database 103 can be updated in real-time or near real-time when, for example, an event related to a user, groups or users or non-person entities occurs. In some embodiments the database 103 can be part of, for example, a financial institution system, merchant system, online store system, or other suitable entity capable of designing and producing complex multi-feature assets or multi-feature software objects. One or more components of the asset prediction system 100 can communicate with database 103 via, e.g., the communication bus 101 to retrieve datasets or records 105 and 107 in real-time or near real-time. Accordingly, the asset prediction system 100 can predict, design, and optimize in real-time or near real-time complex multi-feature assets or multi-feature software objects for a user, groups or users, or non-person entity after one or more activities have been executed by a user or non-person entity, and/or on demand e.g., in response to a user request.

The datasets or records 105 and 107 can include variables or features values associated with, for example, multi-feature assets or multi-feature software objects, complex electronic operations involving groups of people, historical activities associated with a user or non-person entity or other suitable type of electronic activity. As further examples, datasets or records 105 and 107 can include data values or data points associated with user profiles and user activity profiles associated with one or more users, or non-person entities such as commercial entities, including merchants, industrial entities, firms and businesses, governmental organizations or other suitable non-person entities. Some examples of data included in user profiles can include demographic data such user name, user address, information related with a user social security number, user income, or other suitable user information. Some examples of data included in a user activity profile can include electronic activity associated with a user of group of users, and/or historical data between the one or more users and an entity or entities. The various components of the asset prediction system 100 may interoperate to predict software objects with complex competitive features between one or more users and one or more entities through the asset prediction engine 117 discussed below with respect to FIG. 2.

In some embodiments, the asset prediction system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, security reports, among other data related to the operation of the asset prediction system 100.

In some embodiments, a user or administrator may interact with the asset prediction system 100 via a display 113 and a user input device interface 121. The input device interface 121 may include, e.g., a mouse, a keyboard, a touch panel of the display 113, motion tracking and/or detecting, a microphone, an imaging device such as a digital camera, among other input devices. Results and statuses related to the system 100 and operation thereof may be displayed to the user via the display 113. Some examples of such results and statuses include the production of complex multi-feature software objects associated with a user, groups of users, or non-person entities.

As shown in FIG. 1, communication bus 101 can also couple the asset prediction system 100 to a network (e.g., network 707 shown in FIG. 7) through a network communication interface 111. In this manner, the system 100 can be part of a network of computers, for example, a local area network ("LAN"), a wide area network ("WAN"), or an Intranet, or a network of networks, for example the Internet. Any or all components of the asset prediction system 100 can be used in conjunction with the subject technology.

Figure 2:
Figure 2:
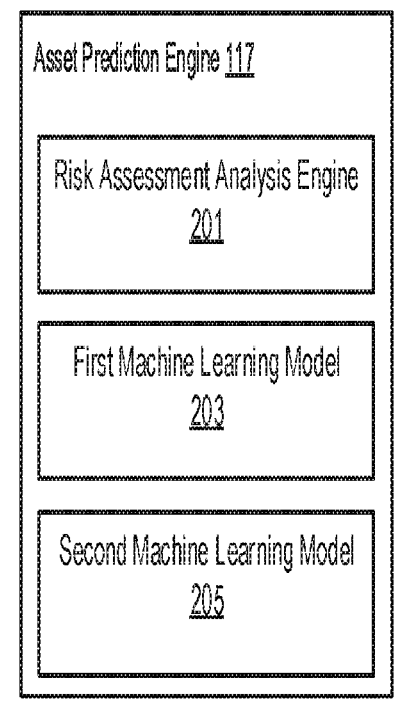

FIG. 2 illustrates examples of internal devices of an asset prediction engine, in accordance with one or more embodiments of the present disclosure. In some embodiments, the asset prediction engine 117 can include one or more risk engines, for example, risk assessment analysis engine 201 and one or more machine learning models including a first machine learning 203, and a second machine learning model 205.

Figure 3:
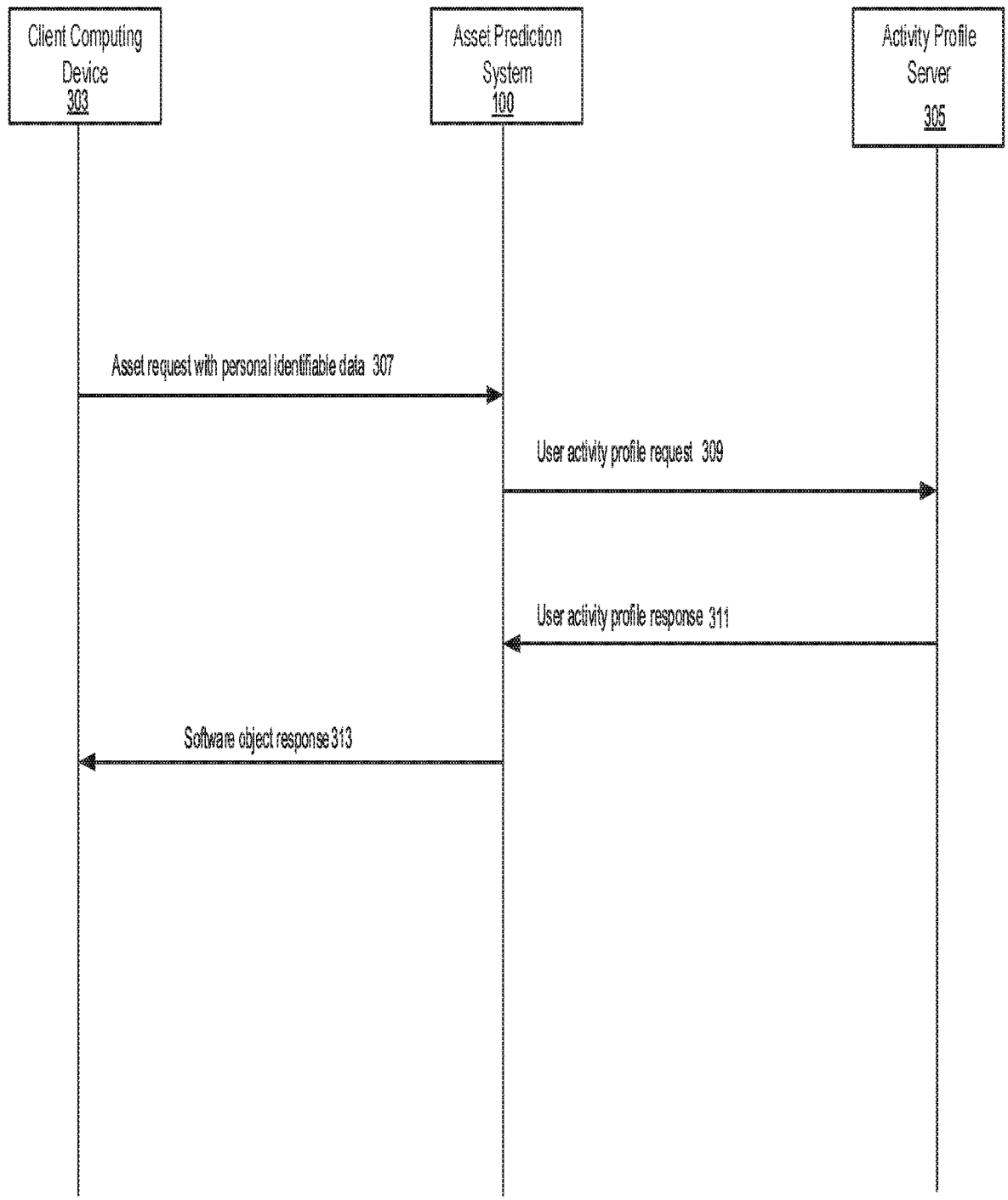

In some embodiments, the asset prediction system 100 can send demographic information associated with a user or non-person entity to a user activity profile server 305 discussed with respect to FIG. 3. Such information can include user name, user address, information related with a user social security number, user income, or other suitable user information. In response, the user activity profile server 305 sends a user activity profile associated with the user profile of a user to the asset prediction system 100. Such a user activity profile or user profile can include raw historical variables values associated with the user or non-person entity. In some instances, the asset prediction system 100 sends the activity profile to the first machine learning model 203. In some embodiments, the first machine learning model can be a categorization machine learning model that can predict multiple features of a user profile. In some embodiments, the first machine learning model 203 or categorization machine learning model can be a trained categorization or instance based machine learning model such as a k-nearest neighbor machine learning model, learning vector quantization machine learning model, self-organization map machine learning model, locally learning machine learning model, or another suitable categorization or instance based machine learning model. In some embodiments, the categorization machine learning model or instance based machine learning model can be trained, for example, based on historical data of multiple users included in multiple user profiles and/or activity profiles.

In some embodiments, the categorization machine learning model can be implemented as a k-nearest neighbor machine learning model that predicts the classification of a first aspect of the user profile. For instance, the output of a k-nearest neighbor machine learning model can be a class membership. In some instances, a user profile or user activity profile represented as data points can be classified by a plurality of votes of the neighboring data points, the activity profile or user profile can be then assigned to a class that has more commonalities among k-nearest neighbors. In some embodiments, the commonalities among k-nearest neighbors can be calculated, for example, by a distance metric such as an Euclidian distance, a Hemming distance, or other suitable type of distance metric.

In some embodiments, the categorization machine learning model can be trained with vectors in a multidimensional space, each vector can be associated with a class label that can be assigned to a user profile or user activity profile. For instance, when the classification machine learning model is implemented as a k-nearest neighbor machine learning model, the model can be trained with labeled feature vectors. The labeled feature vectors can be implemented as data structures that store values associated with activity data of multiple users, for example, data collected from multiple user profiles and/or user activity profiles. In some embodiments, the labeled feature vectors can include values associated with, for example, a payment history of a user, a balance-to-limit ratio of a user credit card, a length of time a user financial accounts associated has been opened, a user activity of a financial credit account, and other suitable data associated with a user profile or user activity profile.

In some embodiments, a classification machine learning model can receive a user activity profile and classify the user activity profile by assigning one or more classes to the user activity profile. In some embodiments, such classes can correspond to one or more features of a software object. In some embodiments, the features of the software objects can include a credit line pre-approved by a financial institution, an annual percentage rate, a type of rewards program (e.g. airline miles, gift cards, and/or points corresponding to a monetary amount, a pre-approved membership program offered by an organization or institution, a pre-approved health insurance program and other suitable features or features.

In some embodiments, the asset prediction system 100 can send the user activity profile to the risk assessment analysis engine 201. The risk assessment analysis engine 201 produces a second aspect of a user profile including, for example, a set of preapproved software objects associated with a user profile of a user. For example, in the case of a credit card asset, the risk assessment analysis engine 201 can compute based on the user activity profile, the risk that a counterparty (e.g., a user or non-person entity) does not have the currency promised to be delivered in association to an asset or has an ability to pay back up to a credit limit. Some computational techniques that can be executed by the risk assessment analysis engine can include annualized loss expectancy, annualized rate of occurrence, single-loss expectancy, a machine learning technique, or other suitable type of risk assessment computation. In some instances, the risk assessment analysis engine 201 can predict a second aspect of the user profile, for example, set of preapproved software objects, wherein each of the software objects be associated with an asset, a resource, and/or a product and can have different characteristics such as interest rate, asset fees, credit limits, grace periods, rewards, or other suitable characteristics of a software object. In some embodiments, the risk assessment analysis engine 201 can execute a risk-assessment analysis using the user activity profile associated with a user to generate a set of confidence values. In some instances, each confidence value from the set of confidence values can indicate a confidence of a match between a user and a software object so as to the software object can be customized for the user. In some embodiments, the confidence value can indicate a probability that an association between a type of software object, and a user will be approved by a financial entity, for example without limitation, a bank. In some embodiments, the confidence values can indicate a probability that a user will pay a monetary amount to a financial institution associated with a user credit line.

In some embodiments, the asset prediction system 100 can send the first aspect of the user profile and the second aspect of the user profile to the second machine learning model 205. The second machine learning model can be an optimization machine learning model. In some instances, there could be competitive objectives between a user and an entity associated with a software object. In such a case, the second machine learning model 205 can harmonize the competitive objectives such that, the user and the entity associated with the software object receive the best possible benefits from assigning the software object to the user. Some examples of such competitive objectives or interests can include maximizing a profit for the entity associated with the asset or software object and minimizing an interest rate associated with the software object, and/or maximizing the probability that a user will accept at least one software object suggested by the asset prediction system 100 and minimizing a risk of monetary loss that may be suffered by the entity associated with the software object.

In some embodiments, the second machine learning model 205 can be a trained with historical data collected from user profiles and user activity profiles of multiple users. In some instances, the user profiles and/or activity profiles can be collected from databases owned by organizations, institutions, or other suitable non-person entity that may or may not be associated or have an interest on the software object or user. In some embodiments, the machine learning model 205 can be, for example, an ensemble machine learning model such as a gradient boosting machine, random forest model, bootstrap aggregation model, stacked generalization model, gradient boosted regression tree model, radial basis function network model, or other suitable type of machine learning model.

In some embodiments, the second machine learning model can be implemented as a gradient boosting machine model. In some embodiments, a gradient boosting machine learning model can be configured to sequentially produce a model in the form of linear combinations or predictions by solving multi-dimensional complex optimization problems. In some instances, the gradient boosting machine learning model can be implemented by sequentially building a series of, for example, decision tree models to generate a composite model. Accordingly, the gradient boosting machine learning model can include multiple decision tree models built in a stage-wise way.

In some embodiments, the gradient boosting machine learning model can generalize the multiple decision tree models enabling an optimization of an arbitrary differential function. In some embodiments, the differential function can correspond to an error or loss function, a cost function, or other suitable type of function. In some instances, when the differential function corresponds to an error or loss function, the function can indicate a measure of how fit a decision tree model is to predict a targeted software object. In some instances, when the differential function corresponds to a cost function, the cost function can indicate a measure of how unfit a decision tree model is to predict a targeted software object. The differential function can be used to build the series of decision trees, for example, after calculating an error or loss value of a first decision tree model a second decision tree model can be built to reduce the error or loss value of the composite model and so on until the error or loss value does not significantly change or does not change at all. Thus, producing an optimized software object that balances competitive objectives of, for example, a user and an entity associated with software object. In some embodiments, such competitive objective can be associated with a credit line pre-approved by a financial institution, an annual percentage rate, a type of rewards program (e.g. airline miles, gift cards, and/or points corresponding to a monetary amount, a pre-approved membership program offered by an organization or institution, and other suitable type of competitive objectives. Accordingly, the optimization machine learning model or gradient boosting machine learning model can reduce a loss or maximize a gain for the user and the entity associated with the software object.

FIG. 3 illustrates a swim lane diagram with examples of communications between a client computing device, an asset prediction system, and a user activity profile server, in accordance with one or more embodiments of the present disclosure. In some instances, a user operating client computing device 303 can send a request with personal identifiable or demographic data 307 of the user to the asset prediction system 100. The asset prediction system 100 can send a user activity profile request 309 to the activity profile server 305. In some instances, the user activity profile server 305 can be part of an agency that gathers account information from various creditors and the historical data provided by the user activity profile server 305 can include information regarding the user borrowing and bill payment habits. It is noted that the user activity profile request 309 does not negatively affect the user activity profile of the user. For instance, if the activity profile server 305 manages the credit score of the user, the request 309 does not negatively affect the user credit score because the request can be analogous to a soft hit or soft pull made to a credit bureau that is not associated with a specific application for a new credit line. In response to the request 309, the user activity profile server 305 can send a user activity profile response 311 to the asset prediction system 100. Such a user activity profile response can include a user activity profile associated with the user including electronic activity associated with the user and/or historical activity data between the user and one or more entities. Thereafter, the asset prediction system 100 can design and produce an optimized asset or software object at 313 balancing competitive objectives between the user and an entity associated with the software object.

In some embodiments, the communication between a client computing device 303, an asset prediction system 100, and a user activity profile server 305 shown in FIG. 3 can be securely executed using one or more tokenization techniques. In some embodiments, the asset prediction system 100 can utilize one or more unique tokens to securely communicate the personal identifiable data of the user and manage one or more software objects of assets, having the personal identifiable data of the user and customized to the user and/or a particular activity of the user. For example, the asset prediction system 100 can utilize one or more unique tokens to securely receive asset requests with personal identifiable data 307 and transmit one or more software objects of assets to and from 1) computing environment(s) (e.g., website(s), mobile app(s), etc.) controlled or associated with the asset prediction system 100 and/or 2) third party computing environment(s) (e.g., website(s), mobile app(s), etc.). For example, a computing environment can be an application that can be running on or executing in the client computing device 303.

For example, the asset prediction system 100 can utilize token-based application programming interface (API) calls to grant an authenticated access to a computing device associated with the user or a third party to at least one feature or characteristic of one or more software objects of assets, having the personal identifiable data of the user and customized to the user and/or a particular activity of the user.

In some embodiments, the asset prediction system 100 can also utilize at least one encryption technique to encrypt communications such as, without limitation, asset request with personal identifiable data 307 and/or the software object response 313. For example, the asset prediction system 100 can also utilize JavaScript Object Notation (JSON) Web Encryption (JWE) or another suitable encryption technique to encrypt the software object response 313.

In some embodiments, the asset prediction system 100 can utilize session tokens for managing communications and/or software objects of assets such as, without limitation, the asset request with personal identifiable data 307 and/or the software object response 313. In some embodiments, the asset prediction system 100 can program a session token to enable the response 313 to be valid or active for a predetermined time (e.g., 10 minutes, 20 minutes, or other predetermined time). In some embodiments, the asset prediction system 100 can utilize a session token to prevent response 313 to be sent or transferred to other users that are not associated with or not entitled to access the personal identifiable data of the user sent at 307.

Figure 4:
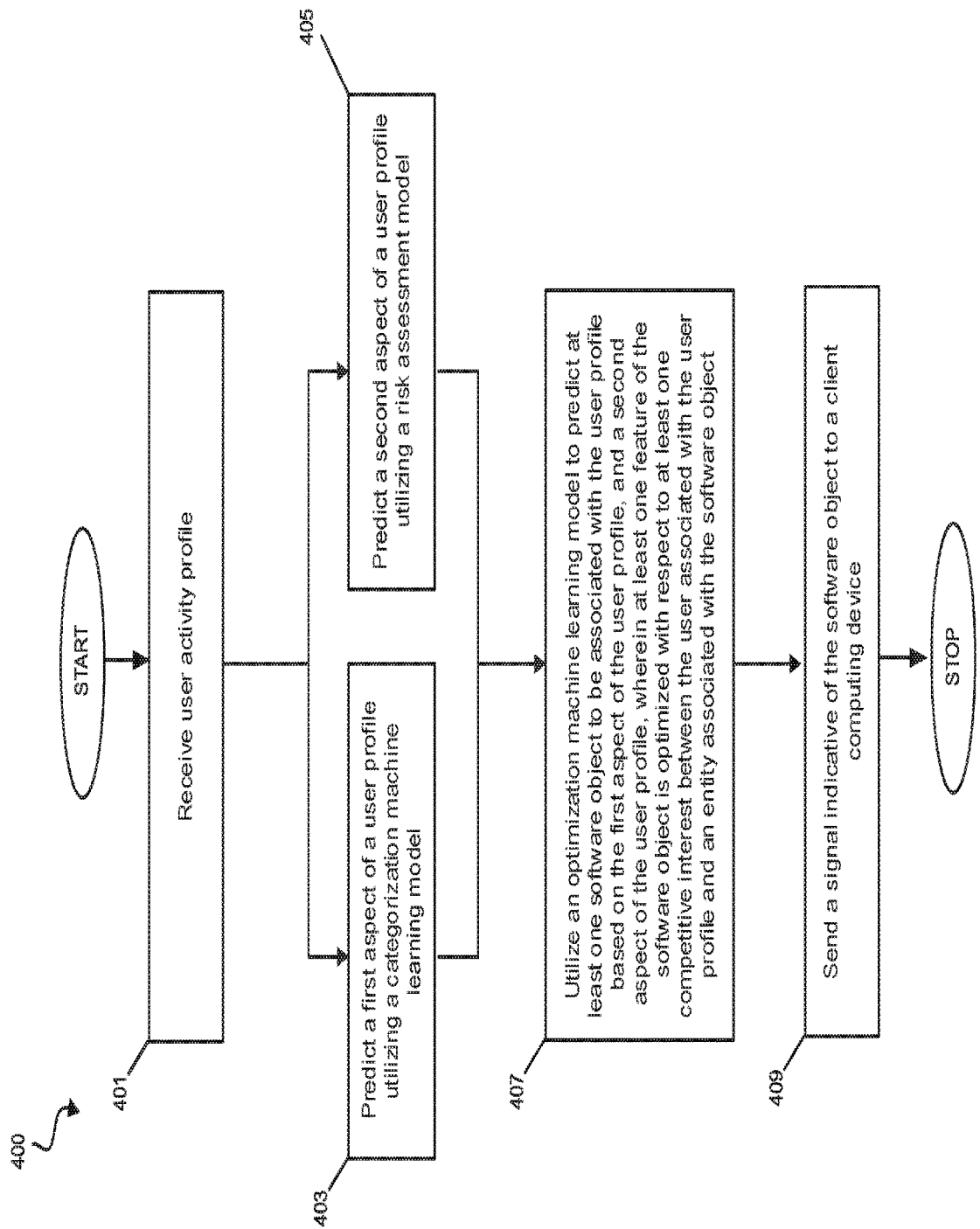

FIG. 4 is a flow chart illustrative of examples of computations executed by an asset prediction system, in accordance with one or more embodiments of the present disclosure. In some instances, the asset prediction system 100 receives a user activity profile at 401. At 403, a categorization machine learning model can use the user activity profile to produce a first aspect of a user profile. Likewise, a risk assessment model can predict a second aspect of the user profile as shown at 405, the second aspect can be associated with one or more confidence values generated via the risk assessment analysis engine 201 shown at FIG. 2. Thereafter, at 407, the asset prediction system 100 can predict one or more software objects associated with the user profile utilizing an optimization machine learning model, using as input the first aspect of the user profile, and the second aspect of the user profile and/or the confidence values associated with the second aspect of the user profile. Such software objects can be optimized with respect to at least one competitive objective or interest between a user associated with the user profile and an entity associated with the software object. The asset prediction system 100 can then send a signal 409 to for example client computing device 303 discussed with reference to FIG. 3. Such a signal can include information for the user regarding more than one optimized software object developed specifically for the user.

Figure 5:
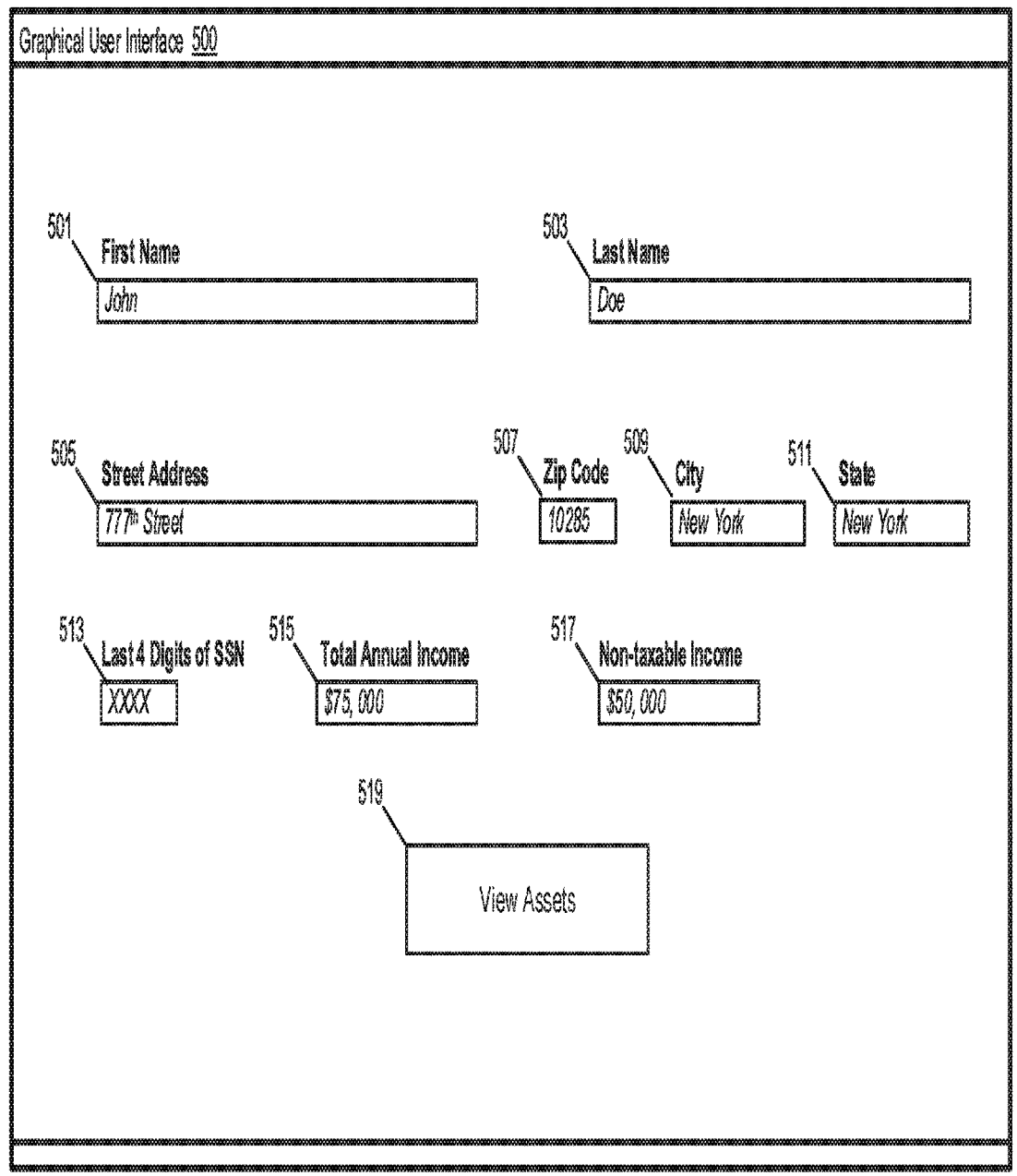

FIG. 5 illustrates an example of a graphical user interface of a client computing device, in accordance with one or more embodiments of the present disclosure. In some embodiments, the graphical user interface 500 can be rendered on the display of a client computing device, for example, client computing device 303 discussed with reference to FIG. 3. A user can enter demographic data or personal identifiable data via the graphical user interface 500. Such data can be transmitted to the asset prediction system 100 such that the asset prediction system 100 designs and produces an optimized asset or software object. Some examples of the user data that can be inputted to the asset prediction system 100 can include first name 501, last name 503, street address 505, zip code 507, city 509, state 511, identifiable information of a user social security number, for example, the last four digits of the user social security number 513, user total annual income 515, and user nontaxable income 517. In some instances, after a user has entered the information shown on graphical user interface 500, the user can press the button 519 to view preapproved and optimized assets or software objects. It is noted, that the asset prediction system 100 can produce the pre-approved and optimized asset or software object in real-time or near real-time.

Figure 6:
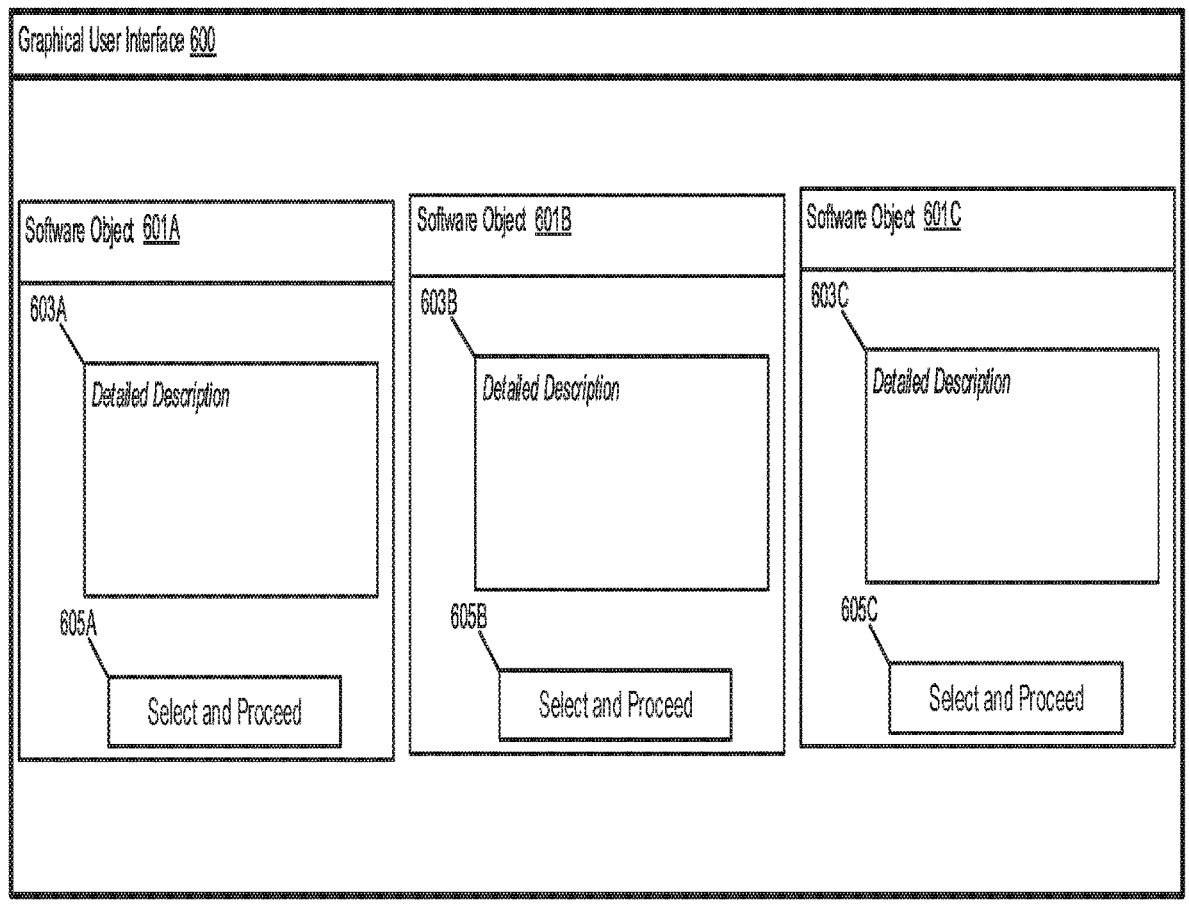

FIG. 6 illustrates an example of a graphical user interface of a client computing device, in accordance with one or more embodiments of the present disclosure. In some embodiments, the graphical user interface 600 is rendered on a display of the client computing device after the user has entered her personal identifiable information or demographic information discussed with reference to FIG. 5. The graphical user interface 600 shows a set of optimized assets or software objects that a user can select via the buttons 605A, 605B, and 605C. Each optimized asset or optimized software object can have a title or identifier name as shown at 601A, 601B, and 601C. The details descriptions 603A, 603B, and 603C can include features that can vary from one asset to another. For instance, in a software object representing a credit card asset some features or characteristics can vary including, interest rate, asset fees, credit limits, grace periods, rewards, or other suitable characteristics of an asset. It is noted, that the features or characteristics of an asset or software object are preapproved and shown upfront in real-time or near real-time before the user apply for an asset or software object. In other words, users do not have to fill out an application form to learn to what software objects or assets they are eligible or qualified and with what type of features or characteristics. In some instances, when a user selects a software object (e.g., software object 601A, 601B, or 601C), the user information such as demographics, activity profile, and/or user profile can be used to re-train one or more of the first machine learning model 203 and/or the second machine learning model 205. Likewise, the user information can be used to re-train one or more of the first machine learning model 203 and/or the second machine learning model 205 when a user declines one or more of the software objects shown in FIG. 6.

Figure 7:
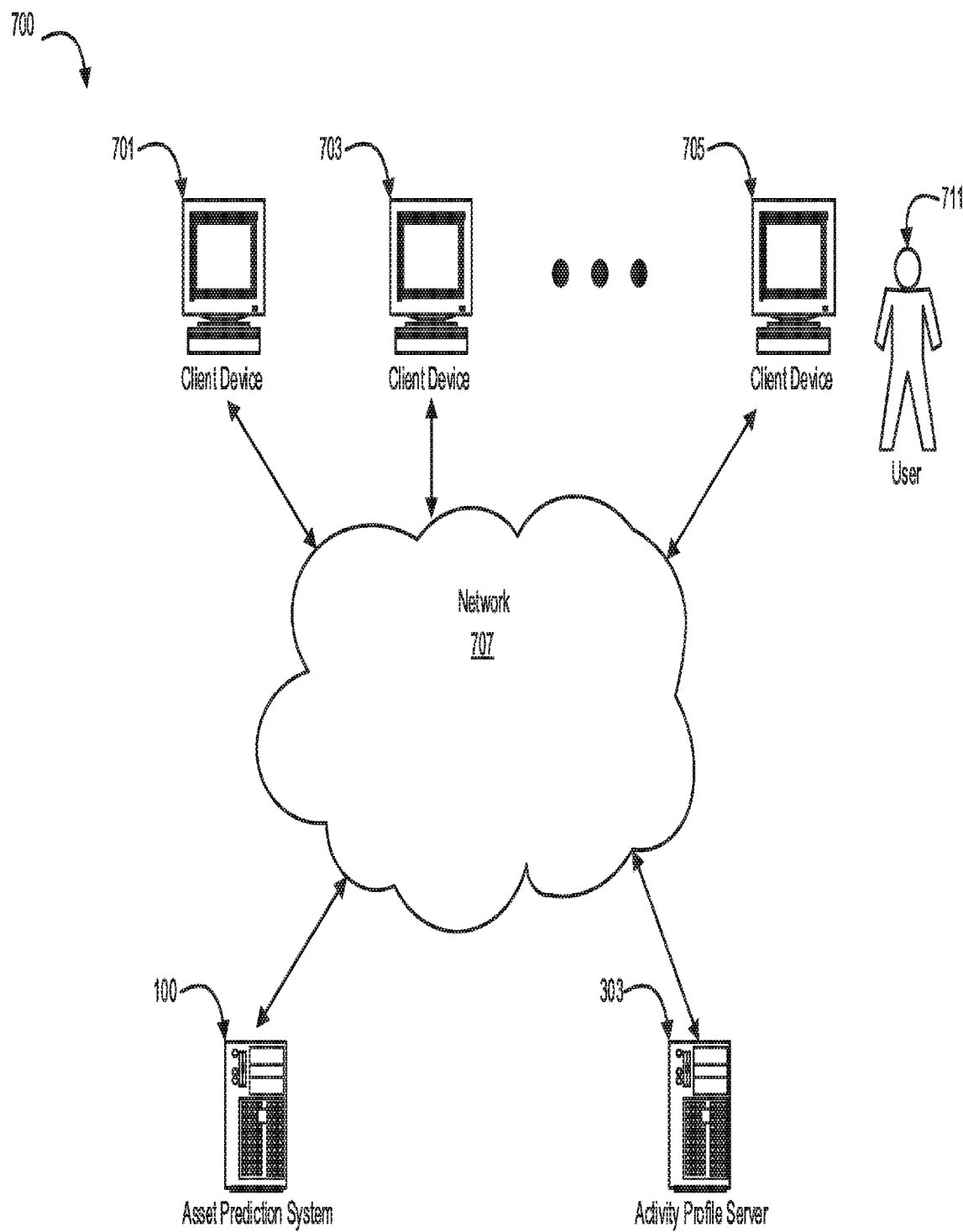

FIG. 7 depicts a block diagram of an example of the computer-based system 700, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the examples of computing components of the computer-based system 700 may be configured to manage large numbers of members and/or concurrent transactions or electronic activities, as detailed herein. In some embodiments, the computer-based system 700 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 701, 703, and 705 (e.g., clients) of the computer-based system 700 may include virtually any computing device capable of receiving and sending a message over a network (e.g., cloud network), such as network 707, to and from another computing device, such as server implementing the asset prediction system 100, and an activity profile server 303 and the like. In some embodiments a server can implement the asset prediction system 100 discussed above with reference to FIG. 1. In some embodiments asset prediction system 100 can be part of a financial institution system, merchant system, online store system, or other suitable entity capable of registering historical data associated with a user, group of users and/or non-person entity. In some embodiments, the asset prediction system 100 can implement the database 103 discussed above with reference to FIG. 1. In some embodiments the member devices 701, 703, and 705 can be used to submit (for example by user 711) personal identifiable information to the asset prediction system 100 and select an optimized software object. In some embodiments, the member devices 701, 703, and 705 may be personal computers, multiprocessor systems, microprocessor-based or programmable consumer electronics, network PCs, and the like. In some embodiments, one or more member devices within member devices 701, 703, and 705 may include computing devices that typically connect using a wireless communications medium such as cell phones, smart phones, pagers, radio frequency (RF) devices, infrared (IR) devices, Cellular Broadcast (CB), integrated devices combining one or more of the preceding devices, or virtually any mobile computing device, and the like. In some embodiments, one or more member devices within member devices 701, 703, and 705 may be devices that are capable of connecting using a wired or wireless communication medium such as, wearable computer, a laptop, tablet, desktop computer, a netbook, a video game device, a pager, a smart phone, and/or any other device that is equipped to communicate over a wired and/or wireless communication medium. In some embodiments, one or more member devices within member devices 701, 703, and 705 may run one or more applications, such as Internet browsers, mobile applications, voice calls, video games, videoconferencing, and email, among others. In some embodiments, one or more member devices within member devices 701, 703, and 705 may be configured to receive and to send web pages, and the like. In some embodiments, a browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 701, 703, and 705 may be specifically programmed by either Java, .Net, QT, C, C++ and/or other suitable programming language. In some embodiments, one or more member devices within member devices 701, 703, and 705 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the network 707 may provide network access, data transport and/or other services to any computing device coupled to it. In some embodiments, the network 707 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 707 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 707 may include and implement, as an alternative or in conjunction with one or more of the above, a WiMAX architecture defined by the WiMAX forum. In some embodiments and, optionally, in combination of any embodiment described above or below, the network 707 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 707 may be transmitted based at least in part on one of more communication modes such as but not limited to: Near-Field Communication (NFC), Radio Frequency Identification (RFID), Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 707 may also include mass storage, such as Network Attached Storage (NAS), a Storage Area Network (SAN), a Content Delivery Network (CDN) or other forms of computer or machine-readable media.

In some embodiments, the servers 100 and 303 may be a web server (or a series of servers) running a network operating system. In some embodiments, the servers 100 and 303 may be used for and/or provide cloud and/or network computing. Although not shown in FIG. 7, in some embodiments, the servers 100 and 303 may have connections to external systems like email, text messaging, ad content providers, etc.

In some embodiments and, optionally, in combination of any embodiment described above or below, for example, one or more computing member devices 701, 703, and 705, the asset prediction system 100 and server 303, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROMI); random access memory (RAM); magnetic disk storage media; optical storage media; flash memory devices, and others. In some embodiments, the non-transitory machine-readable medium can include one or more storage devices, and memory devices described above.

As used herein, the terms "computer engine" and "engine" identify at least one software component and/or a combination of at least one software component and at least one hardware component designed/programmed/configured to interact with other software and/or hardware components and/or compute system outputs.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various embodiments, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, embodiments consistent with principles of the disclosure are not limited to any specific combination of hardware circuitry or hardware components and/or software.

In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

As used herein, term "cloud" and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by a hardware of one type running (Operating System) OS of one type may emulate hardware of a different type and/or an OS of a different type, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

At least some features of the present disclosure will now be described with reference to the following numbered clauses.

Clause 1: An apparatus, comprising:
   a processor;
     and a non-transitory memory storing instructions which, when executed by the processor, causes the processor to:
       receive personal identifiable data associated with a user, the personal identifiable data received during a client session from a first computing device;
       receive a dataset associated with the user based on the personal identifiable data wherein the dataset is received from a second computing device;
       extract from the dataset, a plurality of values associated with historical data of the user;
       predict a plurality of software objects customized for the user utilizing a trained categorization machine learning model and the plurality of values associated with historical data of the user, and for each of the plurality of software objects determine a first aspect from a plurality of features of that software object;
       perform a risk-assessment analysis using the plurality of values associated with the historical data of the user to generate a set of confidence values, wherein each confidence value from the set of confidence values indicates an association between each software object from the plurality of software objects and a second aspect from the plurality of features of that software object;
       produce at least one software object utilizing a trained optimization machine learning model with the first aspect of the software object, the second aspect of the software object, and the set of confidence values, wherein the at least one software object is optimized with respect to at least one competitive interest between the user and an entity provider of the at least one software object; and
       output a notification indicative of the at least one software object to the first computing device associated with the user during the client session.

Clause 2: A method, comprising:
   receiving, by a processor, personal identifiable data associated with a user, the personal identifiable data received during a client session from a first computing device;

receiving, by the processor, a dataset associated with the user based on the personal identifiable data wherein the dataset is received from a second computing device;

extracting, by the processor, a plurality of values associated with historical data of the user;

predicting, by the processor, a plurality of software objects customized for the user utilizing a trained categorization machine learning model and the plurality of values associated with historical data of the user, and for each of the plurality of software objects determine a first aspect from a plurality of features of that software object;

performing, by the processor, a risk-assessment analysis using the plurality of values associated with the historical data of the user to generate a set of confidence values, wherein each confidence value from the set of confidence values indicates an association between each software object from the plurality of software objects and a second aspect from the plurality of features of that software object;

producing, by the processor, at least one software object utilizing a trained optimization machine learning model with the first aspect of the software object, the second aspect of the software object, and the set of confidence values, wherein the at least one software object is optimized with respect to at least one competitive interest between the user and an entity provider of the at least one software object; and outputting, by the processor, a notification indicative of the at least one software object to the first computing device associated with the user during the client session.

Clause 3: A non-transitory computer readable medium comprising code which, when executed by a processor, causes the processor to:

receive personal identifiable data associated with a user, the personal identifiable data received during a client session from a first computing device;

receive a dataset associated with the user based on the personal identifiable data wherein the dataset is received from a second computing device;

extract from the dataset, a plurality of values associated with historical data of the user;

predict a plurality of software objects customized for the user utilizing a trained categorization machine learning model and the plurality of values associated with historical data of the user, and for each of the plurality of software objects determine a first aspect from a plurality of features of that software object;

perform a risk-assessment analysis using the plurality of values associated with the historical data of the user to generate a set of confidence values, wherein each confidence value from the set of confidence values indicates an association between each software object from the plurality of software objects and a second aspect from the plurality of features of that software object;

produce at least one software object utilizing a trained optimization machine learning model with the first aspect of the software object, the second aspect of the software object, and the set of confidence values, wherein the at least one software object is optimized with respect to at least one competitive interest between the user and an entity provider of the at least one software object; and output a notification indicative of the at least one software object to the first device associated with the user during the client session.

While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:

1. A system, comprising:
   a processor; and
   a non-transitory memory storing instructions which, when executed by the processor, causes the processor to:
   receive a user activity profile of a user;
   determine, using a categorization machine learning model, a first aspect of a user profile based on at least the user activity profile;
   determine, using a risk assessment model, a second aspect of the user profile based on at least the user activity profile;
   predict, using a trained optimization machine learning model, a set of software objects based on the first aspect and the second aspect, wherein a software object of the set of software objects is optimized with respect to at least one competitive interest between the user and an entity provider of the software object, and wherein the software object is associated with feature values; and
   output a notification indicative of the set of software objects and corresponding feature values to a computing device associated with the user, wherein the set of software objects and the corresponding features values are displayed on a user interface of the computing device associated with the user.

2. The system of claim 1, wherein the categorization machine learning model is a trained categorization or instance based machine learning model configured to predict one or more aspects of the user profile.

3. The system of claim 2, wherein the categorization machine learning model comprises a k-nearest neighbor machine learning model, a learning vector quantization machine learning model, or a locally learning machine learning model.

4. The system of claim 1, wherein the risk assessment model performs a risk assessment analysis using the user activity profile to generate a confidence value.

5. The system of claim 4, wherein the confidence value indicates a probability that an association between a type of the software object and the user will be approved by the entity provider.

6. The system of claim 1, wherein the at least one competitive interest comprises maximizing a profit of the entity provider and minimizing an interest rate associated with the software object, or maximizing a probability that the user accepts the software object and minimizing a risk of monetary loss by the entity provider associated with the software object.

7. The system of claim 1, wherein the trained optimization machine learning model comprises a gradient boosting machine learning model, a random forest model, a bootstrap aggregation model, a stacked generalization model, a gradient boosted regression tree model, or a radial basis function network model.

8. The system of claim 1, the processor is further configured to:
wherein the categorization machine learning model is trained using historical data included in a plurality of user activity profiles.

9. The system of claim 1, the processor is configured to:
assign a class to the user activity profile, wherein the class corresponds to a feature of the software object.

10. A method, comprising:
receiving, by one or more processors, a user activity profile of a user;
determining, by the one or more processors and using a categorization machine learning model, a first aspect of a user profile based on at least the user activity profile;
determining, by the one or more processors and using a risk assessment model, a second aspect of the user profile based on at least the user activity profile;
predicting, by the one or more processors and using a trained optimization machine learning model, a set of software objects based on the first aspect and the second aspect, wherein a software object of the set of software objects is optimized with respect to at least one competitive interest between the user and an entity provider of the software object, and wherein the software object is associated with feature values; and
outputting, by the one or more processors, a notification indicative of the set software objects and corresponding feature values to a computing device associated with the user, wherein the set of software objects and the corresponding feature values are displayed on a user interface of the computing device associated with the user.

11. The method of claim 10, wherein the categorization machine learning model comprises a k-nearest neighbor machine learning model, a learning vector quantization machine learning model, or a locally learning machine learning model.

12. The method of claim 10, wherein the at least one competitive interest comprises maximizing a profit of the entity provider and minimizing an interest rate associated with the software object, or maximizing a probability that the user accepts the software object and minimizing a risk of monetary loss by the entity provider associated with the software object.

13. The method of claim 10, wherein the categorization machine learning model is trained using historical data included in a plurality of user activity profiles.

14. The method of claim 10, further comprising:
assigning a class to the user activity profile, wherein the class corresponds to a feature of the software object.

15. A non-transitory computer readable medium comprising code which,
when executed by a processor, causes the processor to:
receive a user activity profile of a user;
determine, using a categorization machine learning model, a first aspect of a user profile based on at least the user activity profile;
determine, using a risk assessment model, a second aspect of the user profile based on at least the user activity profile;
predict, using a trained optimization machine learning model, a set of software objects based on the first aspect and the second aspect, wherein a software object of the set of software objects is optimized with respect to at least one competitive interest between the user and an entity provider of the software object, and wherein the software object is associated with feature values; and
output a notification indicative of the set of software objects and corresponding feature values to a computing device associated with the user, wherein the set of software objects and the corresponding feature values are displayed on a user interface of the computing device associated with the user.

16. The non-transitory computer readable medium of claim 15, wherein the categorization machine learning model comprises a k-nearest neighbor machine learning model, a learning vector quantization machine learning model, or a locally learning machine learning model.

17. The non-transitory computer readable medium of claim 15, wherein the at least one competitive interest comprises maximizing a profit of the entity provider and minimizing an interest rate associated with the software object, or maximizing a probability that the user accepts the software object and minimizing a risk of monetary loss by the entity provider associated with the software object.

18. The non-transitory computer readable medium of claim 15, wherein the trained optimization machine learning model comprises a gradient boosting machine learning model, a random forest model, a bootstrap aggregation model, a stacked generalization model, a gradient boosted regression tree model, or a radial basis function network model.

* * * * *